(12) United States Patent
Lin

(10) Patent No.: US 7,000,152 B1
(45) Date of Patent: Feb. 14, 2006

(54) METHOD FOR TRACKING DEFECTIVE SECTORS IN RE-WRITABLE DISK MEDIA

(75) Inventor: Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 381 days.

(21) Appl. No.: 10/129,635

(22) PCT Filed: Nov. 7, 2000

(86) PCT No.: PCT/US00/30605

§ 371 (c)(1),
(2), (4) Date: Sep. 30, 2002

(87) PCT Pub. No.: WO01/35408

PCT Pub. Date: May 17, 2001

Related U.S. Application Data

(60) Provisional application No. 60/164,806, filed on Nov. 10, 1999.

(51) Int. Cl.
*G06F 11/00* (2006.01)
(52) U.S. Cl. .................... 714/42; 714/769; 369/53.15; 369/53.17
(58) Field of Classification Search .................. 714/42, 714/769; 369/47.14, 53.17, 24, 53.35, 53.15, 369/53.24

See application file for complete search history.

(56) References Cited

U.S. PATENT DOCUMENTS

| | | | |
|---|---|---|---|
| 4,498,146 A | 2/1985 | Martinez | .................... 364/900 |
| 4,665,513 A * | 5/1987 | Wengler | .................. 369/53.35 |
| 5,235,585 A | 8/1993 | Bish et al. | .................... 369/54 |
| 5,287,494 A * | 2/1994 | Garcia et al. | .................. 707/7 |

(Continued)

FOREIGN PATENT DOCUMENTS

EP           0889472           1/1999

(Continued)

OTHER PUBLICATIONS

"A Review of the DVD-RAM Format Specification", Version 1; Oct. 3, 1998.

*Primary Examiner*—Robert Beausoliel
*Assistant Examiner*—Philip Guyton
(74) *Attorney, Agent, or Firm*—Joseph S. Tripoli; Joseph J. Laks; Jorge Tony Villabon

(57) ABSTRACT

A method for updating a defect list in a DVD can include processing sectors on the DVD during a playback operation; adding references to selected ones of the processed sectors to a defect candidate list; identifying defective sectors among the selected ones of the processed sectors; and, adding references to the identified defective sectors to the defect list. Additionally, the method can include removing from the defect candidate references to each sector for which a corresponding reference has been added to the defect list. The step of adding references to selected ones of the processed sectors to a defect candidate list can include detecting an unrecoverable error during the playback operation; identifying a processed sector associated with the unrecoverable error; and, adding a reference to the identified sector to the defect candidate list. Also, the identifying step can include identifying each sector having a reference in both the defect list and the defect candidate list; removing references to the identified sectors from the defect candidate list; and, determining whether each sector remaining in the defect candidate list is a defective sector.

26 Claims, 8 Drawing Sheets

U.S. PATENT DOCUMENTS

| | | | |
|---|---|---|---|
| 5,717,915 A * | 2/1998 | Stolfo et al. | 707/5 |
| 5,895,438 A | 4/1999 | Yomtoubian | 702/35 |
| 6,189,118 B1 * | 2/2001 | Sasaki et al. | 714/710 |
| 6,212,647 B1 * | 4/2001 | Sims et al. | 714/8 |
| 6,295,541 B1 * | 9/2001 | Bodnar et al. | 707/203 |
| 6,377,524 B1 * | 4/2002 | Ko | 369/47.14 |
| 6,418,100 B1 * | 7/2002 | Park et al. | 369/47.14 |
| 6,526,009 B1 * | 2/2003 | Van Gestel | 369/47.14 |
| 6,526,522 B1 * | 2/2003 | Park et al. | 714/8 |
| 6,564,345 B1 * | 5/2003 | Kim et al. | 714/723 |

FOREIGN PATENT DOCUMENTS

| | | |
|---|---|---|
| WO | WO 01/06511 A1 | 1/2001 |

* cited by examiner

METHOD FOR TRACKING DEFECTIVE SECTORS IN RE-WRITABLE DISK MEDIA

This application claims the benefit under 35 U.S.C. § 365 of International Application PCT/US00/30605, filed Nov. 7, 2000, which was published in accordance with PCT Article 21(2) on May 17, 2001 in English; and which claims benefit of U.S. provisional application Ser. No. 60/164,806 filed Nov. 10, 1999

BACKGROUND OF THE INVENTION

1. Technical Field

The inventive arrangements relate generally to methods and apparatus for providing advanced operating features for recording data to recordable DVD media, and more particularly to a method and apparatus for tracking defective sectors in recordable DVD media.

2. Description of the Related Art

Various devices have been developed to enable consumers to record video and/or audio programs for later presentation. Such devices include tape recorders, video cassette recorders, recordable compact disks, and most recently, recordable digital versatile disks (DVD). Hard drives and magneto optical disks have also been used. A DVD in which data can be recorded once only, and thereafter is essentially a DVD read only memory, is referred to by the acronym DVD-R. The acronym DVD-R also has been used generally to refer to write-once, or record-once, technology.

In contrast to DVD-R, several formats exist in which data can be recorded to a DVD, erased and re-recorded. In sum, such a DVD can be overwritten or rewritten. These DVDs typically are referred to by the acronyms DVD-RAM, DVD-RW and DVD+RW. Although, as of this time no uniform industry standard has been adopted, the acronyms DVD-RAM, DVD-RW and DVD+RW have been used generally to refer to the respective re-writable DVD technologies. Still, reference herein to re-writable DVD technology, devices and methods and recordable DVD media is generally intended to encompass all of the standards which are now being used, as well as those which may be developed in the future.

Present DVDs can have a logical file structure in which audio-video content can be stored. Specifically, as shown in FIG. 7, at the top of the file structure hierarchy of a DVD 700, one or more titles 701 can exist which can loosely correlate to program episode titles. Titles 701 can consist of control data 702 in addition to one or more Video Object Sets 703 (VOBS). The control data 702 can contain information for managing the title 701. Each VOBS 703 can include a plurality of Video Objects (VOB) 704. Each VOB 704 preferably includes a plurality of Cells 705. Each Cell 705 preferably includes a plurality of Video Object Units (VOBU) 706. Each VOBU 706 roughly correlates to a group of pictures which is the smallest addressable chunk in the DVD 700.

Notably, each VOBU 706 can contain an integer number of video frames. As such, each VOBU 706 can contain 0.4 to 1.0 seconds of presentation material. A typical VOBU 706 in a commercial motion picture can contain 0.5 second of presentation material. Notably, each VOBU 706 can include a sequence of packs 707 positioned in recording order. Preferably, each VOBU can begin with a navigation pack 708 (NV_PCK or NAV_PACK) which can be followed by audio-visual data packs 709, for example video packs (V_PCK), audio packs (A_PCK) and sub-picture packs (SP_PCK). The NV-PCK 708 can contain navigation information, which can be useful in implementing trick modes of operation. The NV_PCK 708 also can include presentation control information (PCI) and data search information (DSI).

Present DVDs can store data using the Universal Disc Format (UDF) specification. As such, present DVDs can include a directory and set of files within the UDF file format. FIG. 8 illustrates the directory structure of a typical DVD. According to the DVD-ROM specification, all files in a DVD are stored in directories 801, 810, 815 and 820 below the root directory 800. In particular, DVD-Video data can be stored a single directory referred to as the VIDEO_TS directory 801. The VIDEO_TS directory 801 can contain a Video Manager and one or more Titles. As illustrated in FIG. 8, the Video Manager can include a Video Manager information file 802, a Video Manager menu file 803, and a Video Manager backup file 804. Additionally, each Title can include a Video Title information file 805A, 805B, a Video Title menu 806A, 806B, one or more video object set files 807A, 807B, 808A, 808B and a Video Title Backup file 809A, 809B.

Aside from DVD-Video, DVD-Audio information can be stored in an analogous directory, AUDIO_TS 810. Furthermore, an optional, root-level directory JACKET_P 815 can contain identifying images for the DVD in three sizes including thumbnails for graphical directories of DVD collections. Notably, a DVD can include other files stored in one or more user-defined directories 820. Such directories and files typically are placed on the DVD following the DVD-Video data and are ignored by conventional DVD players.

Recordable DVD media can be used for thousands or even tens of thousands of times for recordings. For each recording, defective sectors in the recordable DVD media potentially can arise. As a result, recordable DVD media can accumulate a substantial number of defective sectors during the operational lifetime of the recordable DVD media. Yet, defective sectors in recordable DVD media can inhibit proper playback of data stored in the recordable DVD media. Specifically, defective sectors in the control data area, such as a control data VOB for a title set, can invalidate the control data. Moreover, defective sectors in video data in a VOBU can cause video freeze or blockiness. Additionally, defective sectors in audio data in a VOBU can cause audio distortion or noise. Finally, defective sectors in a menu area can damage a menu.

For analog tape recording technology, such as VCR technology, a defective portion of the video tape may not affect the quality of the signal substantially during playback. In contrast, for digital disc recording technology, a defective sector can significantly affect playback quality causing a loss of navigation information and control data, video freeze, blockiness, loss of audio information and menu corruption. As a result, if defective sectors cannot be identified prior to recording to a re-writable disc, an entire recording can be ruined. Accordingly, defective sector checking can be critical to a successful digital disc recording.

Notably, re-writable DVDs each have a defect list that is generated by the manufacturer. Those sectors which are determined to be defective are added to the defect list so that the defective sectors will be skipped during a recording session.

Notwithstanding, in most cases, defect checking cannot be performed in real-time during a recording session. Moreover, to inspect a re-writable DVD for defective sectors by scanning the entire re-writable DVD can consume several hours depending upon the capacity of the re-writable DVD and the front-end speed of the re-writable DVD recorder. Accordingly, it can be impractical to delay the user for the time required to perform the inspection prior to permitting the user to begin recording.

SUMMARY

A method for updating a defect list in a DVD can include playing back the DVD; detecting at least one unrecoverable error associated with at least one corresponding sector during the playback; adding a reference to each sector associated with the unrecoverable error to a defect candidate list; determining whether each sector referred to in the defect candidate list is a defective sector; and adding a reference to each sector determined to be a defective sector to the defect list. Additionally, the method can include removing from the defect candidate list a reference to each sector for which a corresponding reference has been added to the defect list.

The determining step can include identifying each sector having a reference in both the defect list and the defect candidate list; removing the identified sectors from the defect candidate list; and, determining whether each sector remaining in the defect candidate list is a defective sector. The step of identifying each sector having a reference in both the defect list and the defect candidate list can include sorting the defect candidate list in a structured order; sorting the defect list in the structured order; and, subtracting the sorted defect candidate list from the sorted defect list. Notably, the subtraction can result in the identified sectors. Additionally, the sorting steps can include sorting the defect candidate list in ascending order; and, sorting the defect list in ascending order. Similarly, the sorting steps can include sorting the defect candidate list in descending order; and, sorting the defect list in descending order.

A method for updating a defect list in a DVD can include processing sectors on the DVD during a playback operation; adding references to selected ones of the processed sectors to a defect candidate list; identifying defective sectors among the selected ones of the processed sectors; and, adding references to the identified defective sectors to the defect list. Additionally, the method can include removing from the defect candidate references to each sector for which a corresponding reference has been added to the defect list.

The step of adding references to selected ones of the processed sectors to a defect candidate list can include detecting an unrecoverable error during the playback operation; identifying a processed sector associated with the unrecoverable error; and, adding a reference to the identified sector to the defect candidate list. Also, the identifying step can include identifying each sector having a reference in both the defect list and the defect candidate list; removing references to the identified sectors from the defect candidate list; and, determining whether each sector remaining in the defect candidate list is a defective sector.

The step of identifying each sector having a reference in both the defect list and the defect candidate list can include sorting the defect candidate list in a structured order; sorting the defect list in the structured order; and, subtracting the sorted defect candidate list from the sorted defect list. Notably, the subtraction can result in the identified sectors. In one aspect of the method, the sorting steps can include sorting the defect candidate list in ascending order; and, sorting the defect list in ascending order. Similarly, in another aspect of the method, the sorting steps can include sorting the defect candidate list in descending order; and, sorting the defect list in descending order.

DETAILED DESCRIPTION OF THE PREFERRED EMBODIMENTS

Recordable DVD Device

Figure 1:
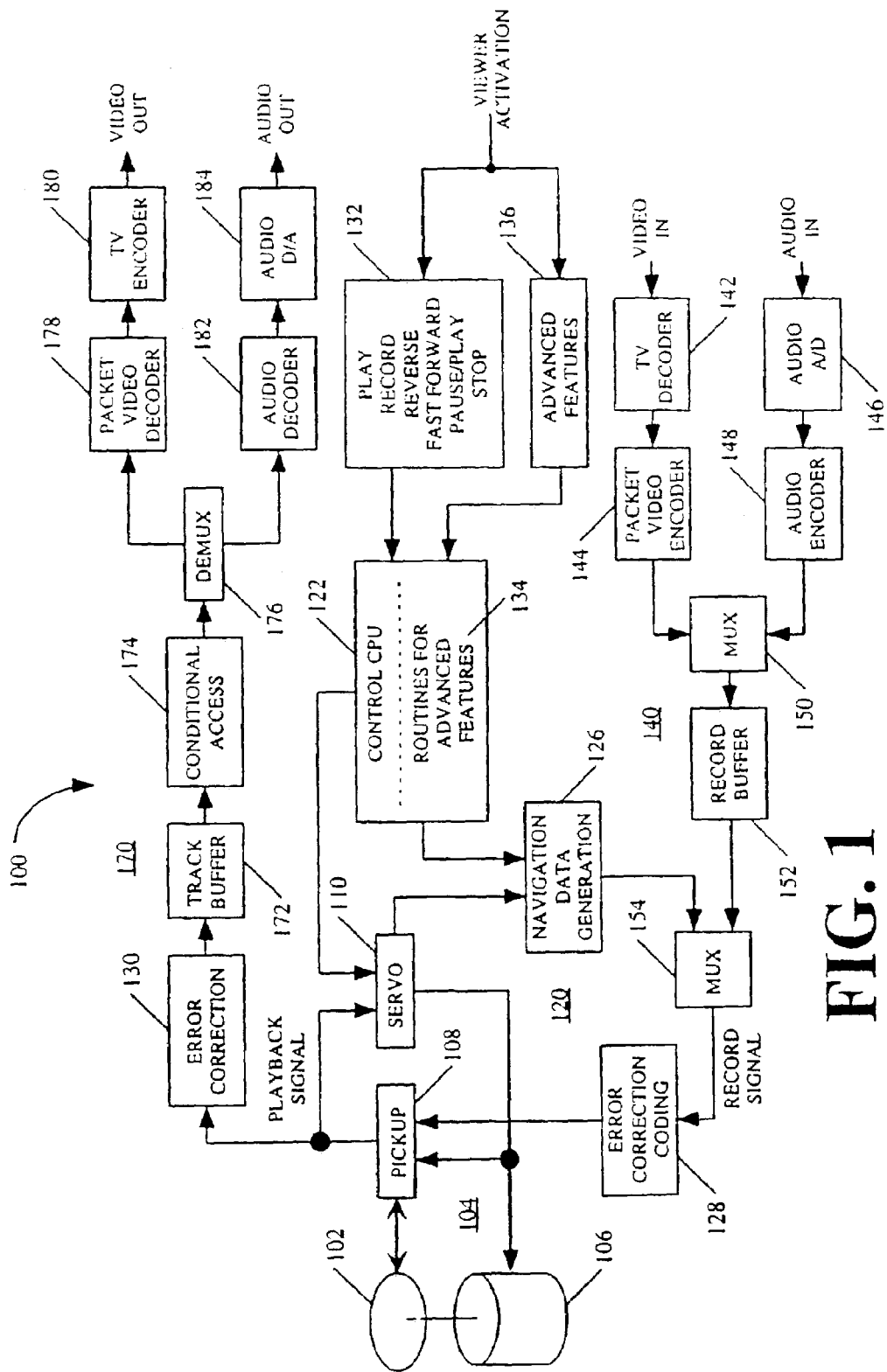
FIG. 1 is a block diagram of a DVD recording device that can be provided with one or more advance operating features in accordance with the inventive arrangements.

A device 100 for implementing the DVD-ROM backwards-compatible defect management method in accordance with the inventive arrangements taught herein utilizes a recordable, re-writable disk medium 102 in accordance with the inventive arrangements is shown in block diagram form in FIG. 1. The re-writable disk medium 102 is embodied as a re-writable DVD in the illustrated embodiment. In many instances, as will be noted, the re-writable disk medium can also be, for example, a hard drive or a magneto optical disk (MOD). An example of a MOD is a minidisk. In many instances, the inventive arrangements are applicable to video or audio or both video and audio.

The device 100 is capable of writing onto and reading from recordable DVD media, in this example, a re-writable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the disk 102 and a pickup assembly 108 that is adapted to be moved over the spinning disk. The pickup 108 and the motor 106 are controlled by a servo 110. The servo 110 can receive a playback signal of data which can be read from a spiral track of the disk 102 as a first input. The playback signal also can be an input to an error correction circuit 130, which can be considered part of the control section or part of the video/audio output processing path.

When reading data from the disk 102, a laser on the pickup assembly 108 can direct laser light at an interior layer surface of the disk 102. Depending upon the data stored on the disk 102, the laser light can be mostly reflected or mostly absorbed. The pickup assembly 108 can interpret reflected light as one type of electrical signal while light absorbed by the interior layer surface of the disk 102 can be interpreted as a second type of electrical signal. In the preferred embodiment, transitions between reflectivity and non-reflectivity are mapped to a digital signal referred to as the playback signal which corresponds to the data stored on the disk 102.

By comparison, during recording, a laser on the pickup assembly burns spots onto a spiral track on the disk 102 in order to digitally record video and/or audio program material. More particularly, the disk 102, which can include at least one interior crystalline recording layer, can exhibit two distinctive states, amorphous or crystalline, each having different reflectivity characteristics. Those different levels of reflectivity can be detected by optical sensors in the pickup assembly 108.

Prior to recording, the interior recording layer of the disk is in a crystalline state exhibiting high reflectivity. The light intensity of a laser beam can be modulated to write amorphous data marks on the surface of tracks in the interior crystalline recording layer. Specifically, the energy of a laser pulse can quickly raise the surface temperature of the interior crystalline recording layer above the layer melting point. Once above the melting point, the interior layer can transition from a crystalline state of high reflectivity to an amorphous state of low reflectivity. Subsequently, the rapid cooling of the layer prevents the molecular structure of the interior layer from reorganizing into a crystalline state. Hence, digital data can be mapped to a series of laser pulses which can write a digital code to the disk 102 which can correspond to the digital data.

Notably, depending upon capacity requirements, the disk 102 can have either one or two recordable sides. Additionally, the disk 102 can have multiple recordable layers per side. However, for purposes of understanding the invention, the number of sides and layers is irrelevant. Moreover, in the event of a double-sided recording, it also is irrelevant whether the recording of both sides of the disk 102 occurs from one or both sides of the disk 102.

Returning now to FIG. 1, the control section 120 preferably comprises a controller 122 and a navigation data generation circuit 126. The controller 122 supplies a first input signal to the navigation data generation circuit 126 and the servo 110 supplies a second input signal to the navigation data generation circuit 126. The servo can also be considered part of the control section 120. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

The controller 122 also preferably has access to the data contained in the track buffer 172 and record buffer 152 as shown in FIG. 1. The controller 122 can delete, modify, and reformat video data stored in the track buffer 172 and record buffer 152 for the purpose of implementing the inventive arrangements. Control and data interfaces are also preferably provided for permitting the controller 122 to control the operation of packet video encoder 144 and audio encoder 148 for implementing the inventive embodiments as described herein. Suitable software or firmware is provided in memory for the conventional operations performed by controller 122. In addition, program routines for the advanced features 134 are provided for controlling the controller 122 in accordance with the invention as shall hereinafter be described in greater detail.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate pause buffer 136 is provided to receive commands for performing the pause during record and playback function.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

The output processing path 170 comprises a track buffer, or output buffer, 172, in which data read from the disk is assembled into packets for further processing. The packets are processed by conditional access circuit 174 that controls propagation of the packets through demultiplexer 176 and into respective paths for video and audio processing. The video is decoded by decoder 178, for example from MPEG-1 or MPEG-2, and encoded as a conventional television signal by TV encoder 180, for example NTSC or PAL. The audio is decoded by circuit 182, for example MPEG-1 or MPEG-2, and converted to analog form by audio digital-to-analog (D/A) converter 184. The output processing path 170 can be deemed to include the error correction circuit 130, as noted.

Device 100 can represent a machine having, for example, a 1× read and 1× write capability. Such devices can typically have maximum data rates for recording or playing back of approximately 11 megabits/second. In order to implement some of the inventive arrangements is necessary to play back (read) and record (write) in a manner that appears to be simultaneous. Apparently simultaneous playing back and recording with such a machine would seem to be impossible, but even such a minimal capability machine can be advantageously operated in accordance with the inventive arrangements to provide apparently simultaneous playing back and recording as well as other inventive arrangements. It will also be appreciated that the inventive arrangements can also be useful for devices having higher data rates.

DVD Media

For purposes of illustrating the inventive arrangements, program material can be recorded onto recordable DVD media, for example the re-writable DVD of FIG. 1, and played back from the re-writable DVD. The re-writable DVD 102, as shown in further detail in FIG. 2, can consist of two substrates bonded together by an adhesive layer forming a 1.2 mm thick disk. A center hole 118 can be formed in the center of the disk so that a gripping device of the motor 106 of FIG. 1 can securely grip the disk and control the angular motion of the same in accordance with the inventive arrangements.

As in conventional DVD-RAM technology, the re-writable DVD 102 of the present invention incorporates a land/groove structure and phase change material to record data to disk. The land/groove combination forms a continuous spiral 112, with data recorded alternately on land and groove, Data can be written onto the re-writable DVD 102 in an outwardly direction along the spiral 112, beginning with the smaller radius portion of the spiral to the larger radius portion of the spiral 112. The several series of three large dots (•••) denote portions of the spiral not shown in the drawing. Each nearly circular, radially concentric section of the spiral 112 can be formed with a side-to-side wobble, not shown in the drawing, to accommodate media type indexing. Due to difficulties of scale and only portions of the spiral 112 are shown, and these are shown in greatly enlarged scale.

To maintain constant data density across the surface of the re-writable DVD 102, the recording surface is divided into twenty-four (24) annular zones. Each zone has 1,888 tracks, including 944 land tracks and 944 grove tracks. Each track is divided into sectors 114 (only a single sector is shown for simplicity). The innermost zone has seventeen (17) sectors per track. The number of sectors per track increases by one in each succeeding zone. Hence, the outermost zone contains forty (40) sectors per track. Each sector 114 begins with a read-only identification field, embossed onto the disk surface. This identification field, known as the header, is used to identify the physical location of the sector and is kept separate from the user recordable data field, to assure that it is permanently readable. The re-writable DVD 102 can further include an embossed area 116 containing read-only data which can identify the type of media, for example DVD-RAM, DVD-ROM, or DVD-R.

Figure 2:
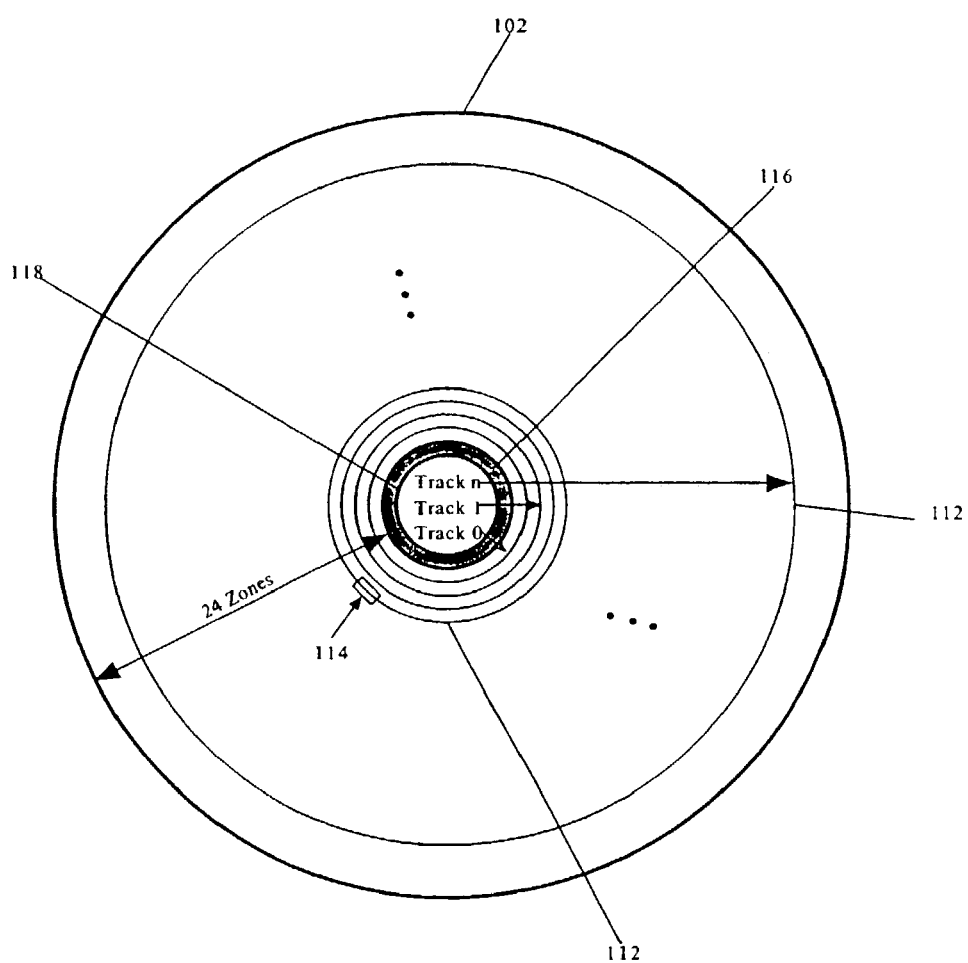
FIG. 2 is a schematic diagram of recordable DVD media.
Figure 3:
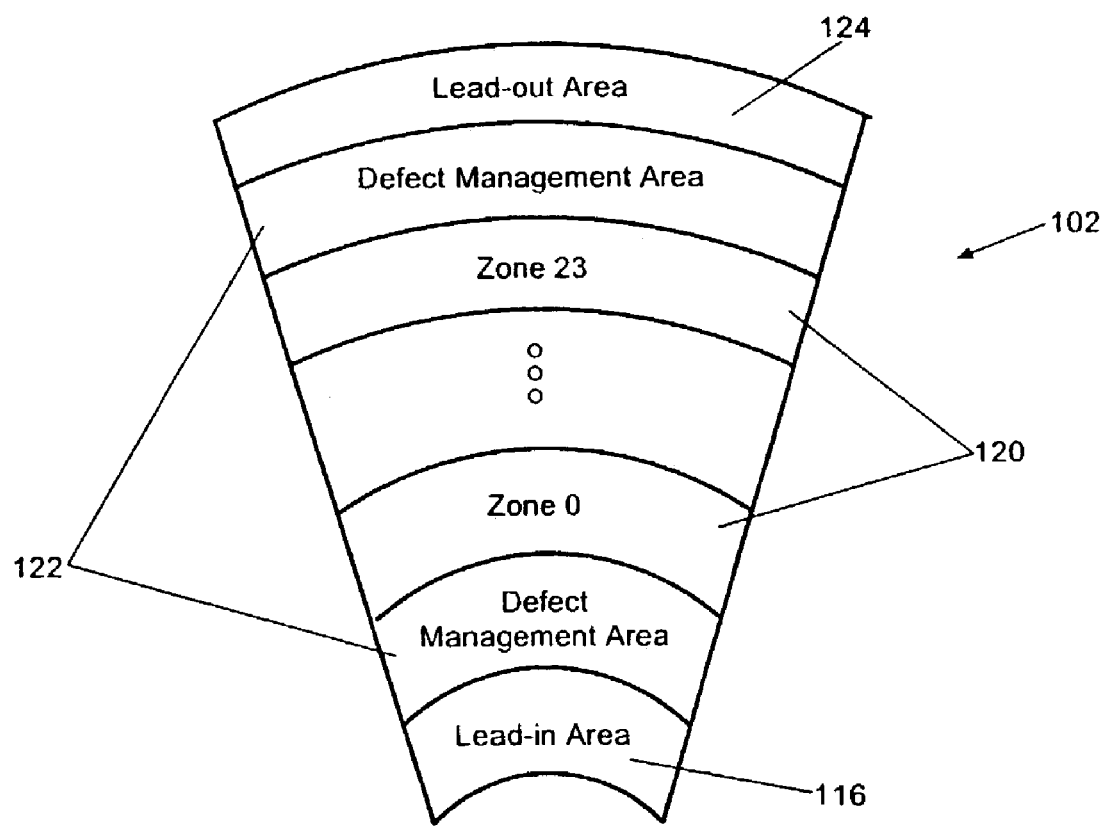
FIG. 3 is a cut-away view of the recordable DVD media of FIG. 2.

FIG. 3 is a cut-away view of the re-writable DVD 102 of FIG. 2. As shown in FIG. 3, a re-writable DVD 102 can include both re-writable data areas and embossed data areas. The embossed data for a re-writable DVD 102 can be located at the innermost portion of the re-writable DVD, referred to as the lead-in area 116. The lead-in area 116 contains information which can identify the type of media, such as DVD-RAM or DVD-R. The rewritable DVD 102 similarly can include a lead-out area 124. Notably, each zone 120 can have a user area and an associated spare area (not shown). The spare area can be used for the replacement of any defective sector detected in the user area. Finally, defective sector addressing can be handled using defect management areas 122. Each defect management area 122 can include a list of defective sectors and associated replacement sectors. Additionally, each defect management area 122 can contain the same information as other defect management areas 122, providing an additional level of redundancy to improve the reliability of the re-writable DVD 102.

It will be appreciated that the advanced features taught herein are applicable to other kinds of disk media and disk media players and recorders. Additionally, various modifications of the device illustrated in FIG. 1 and the disk medium illustrated in FIGS. 2 and 3 can be used together to implement the advanced features taught herein in accordance with the inventive arrangements. In particular, a solution for defective sector management in accordance with the inventive arrangements can include modifications of and additions to hardware, firmware and software in the controller 122 for recording data to recordable DVD media.

Checking Defective Sectors for Digital Disc Recorders

Notably, the present invention can be realized in hardware, software, or a combination of hardware and software. Machine readable storage according to the present invention can be realized in a centralized fashion in one computer system, for example the controller 122, or in a distributed fashion where different elements are spread across several interconnected computer systems. Any kind of computer system or other apparatus adapted for carrying out the methods described herein is acceptable.

Specifically, although the present invention as described herein contemplates the controller 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the controller 122 described above.

In accordance with the inventive arrangements, defective sectors on a re-writable disc are detected and a reference thereto placed in a defect list in the defect management area 122 as shown in FIG. 3. In consequence, those defective sectors having a reference stored in the defect list are not used for recording. More particularly, the defective sectors on a re-writable disc are checked during each playback of the re-writable disc. If an unrecoverable error is detected when playing back a particular sector, the particular sector can be branded as a defective sector candidate. As such, the particular sector can be placed in a defective sector candidate list. If the particular sector later is verified as a genuinely defective sector, a reference to the particular sector can be added to the defect list in the defect management area 122.

Figure 4:
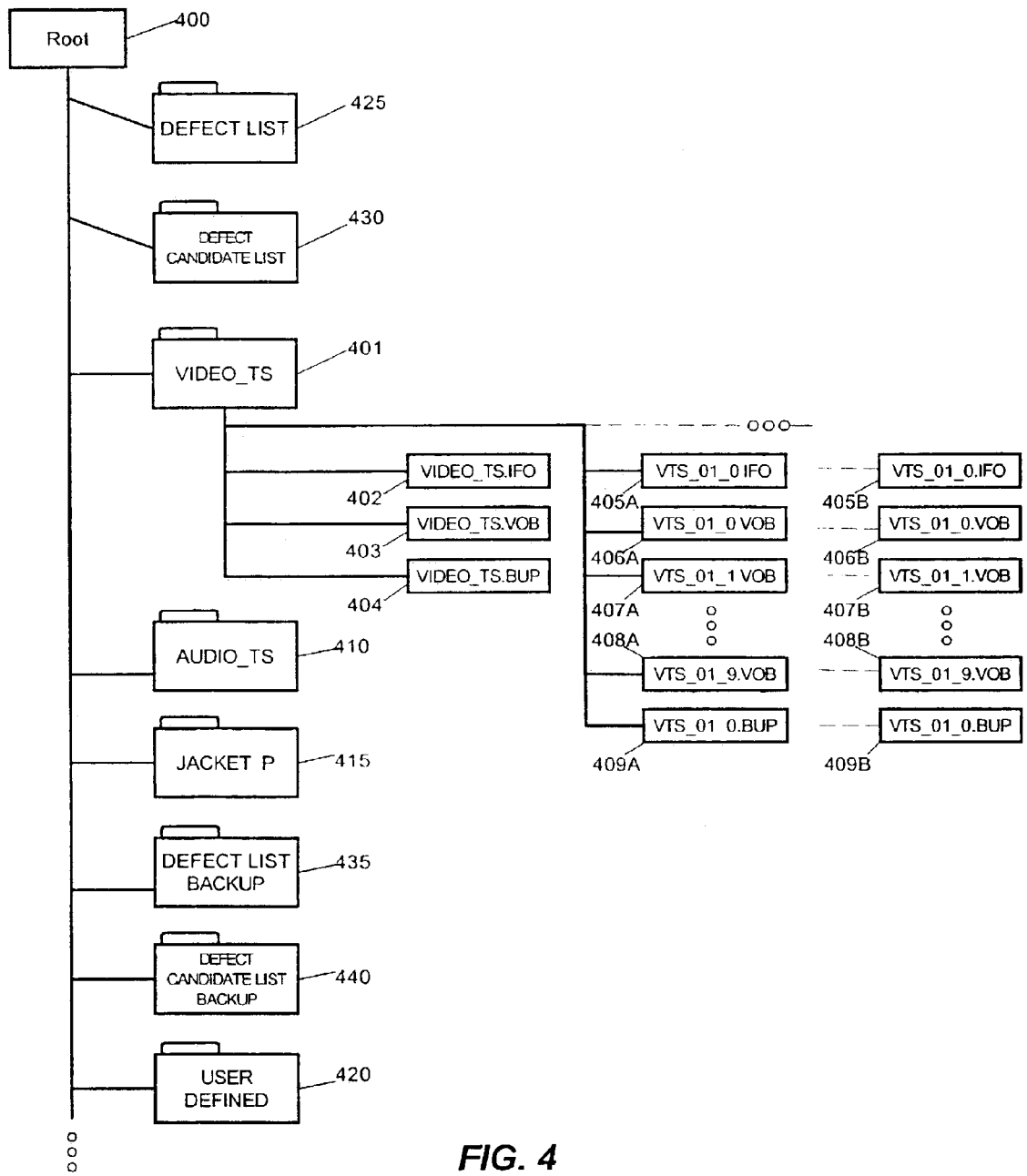
FIG. 4 is a directory tree illustrating a DVD directory and file structure in accordance with the inventive arrangements.

Notably, additional directories can be added to the DVD directory and file structure in order to accommodate the defect list and the defective sector candidate list. Specifically, as shown in the directory tree illustrated in FIG. 4, a DVD directory structure in accordance with the inventive arrangements can include below the root directory 400, a DVD-Video directory 401, a defect list 425, a defect candidate list 430 and corresponding defect list and defect candidate list backup directories 435, 440. Additionally, as in conventional DVD-Video directories, the DVD-Video directory 401 can include a Video Manager information file 402, a Video Manager menu file 403, and the Video Manager backup file 404. Additionally, each Title in the DVD-Video directory 401 can include a Video Title information file 405A, 405B, a Video Title menu 406A, 406B, one or more video object set files 407A, 407B, 408A, 408B and a Video Title Backup file 409A, 409B. Optionally, the DVD directory structure also can include a DVD-Audio directory 410, the JACKET_P directory 415 and other user-definable directories 420.

Figure 5:
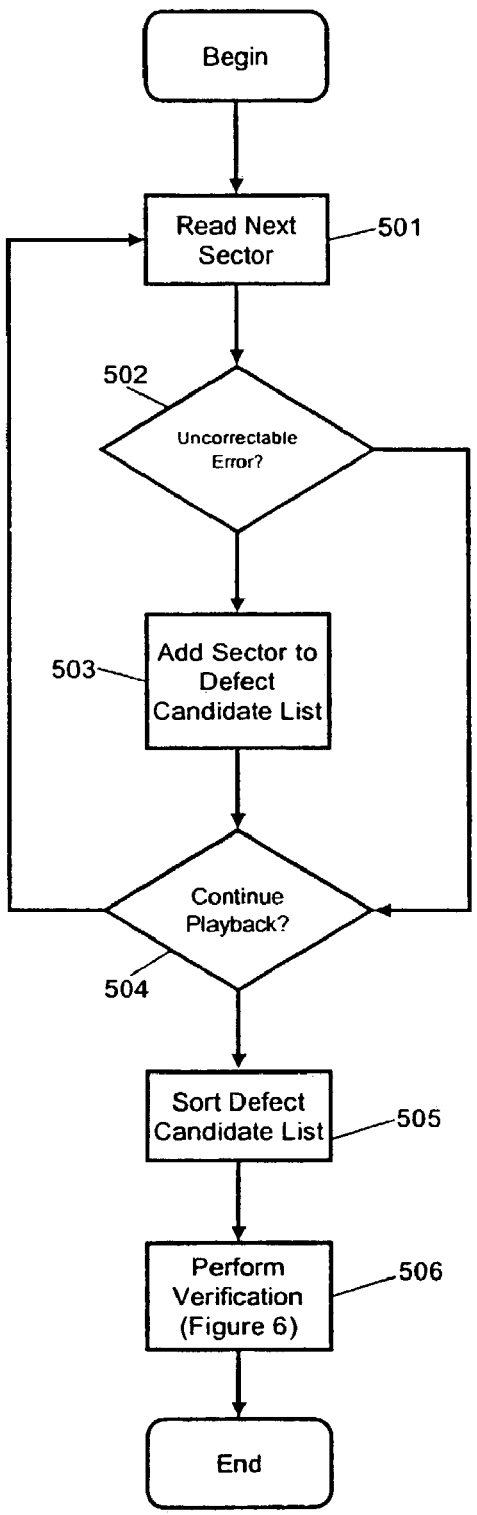
FIG. 5 is a flow chart illustrating a process for identifying defective sectors during playback of a DVD.

A defective sector identification and verification method in accordance with the inventive arrangements advantageously uses the playback function as a defective sector checking process. In consequence, each sector suspected of a defect during the playback of the sector can be added to a defective candidate list. Subsequently, a verification process can determine whether the sectors in the defective candidate list are to be added to the defect list. FIG. 5 is a flow chart illustrating a process for detecting and tracking suspected defective sectors during the execution of a DVD playback function. In accordance with the inventive arrangements, in step 501, first the process can attempt to read a sector in a re-writable DVD. If, in decision step 502, an uncorrectable error is encountered, in step 503 the address of the sector or other suitable reference thereto can be added to a defect candidate list. If, in decision step 504 it is determined that playback should continue, the process can repeat where in step 501, the process can read the next sector in the DVD.

To reduce redundant verification checks of suspected defective sectors contained in a defect candidate list, addresses of suspected defective sectors can be advantageously stored in a structured order in both the defect list and (for verified defective sectors) the defect candidate list. Specifically, where both the defect and the defect candidate list are stored in a structured order, each can be compared and sectors which are not contained in both lists can be more easily identified. For example, both the defect list and the defect candidate list can be sorted in ascending or descending order. In any event, if in step 504 it is determined that playback should not continue, in step 505, the defect candidate list can be sorted according to a specified structure, for instance ascending or descending order. Subsequently, in step 506 the verification process can commence.

Figure 6:
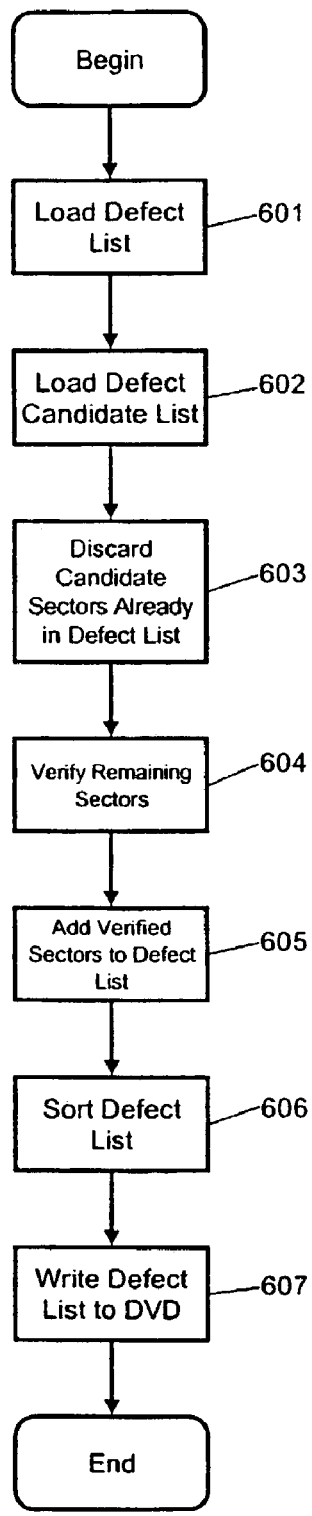
FIG. 6 is a flow chart illustrating a process for verifying the identified defective sectors of FIG. 5.
Figure 7:
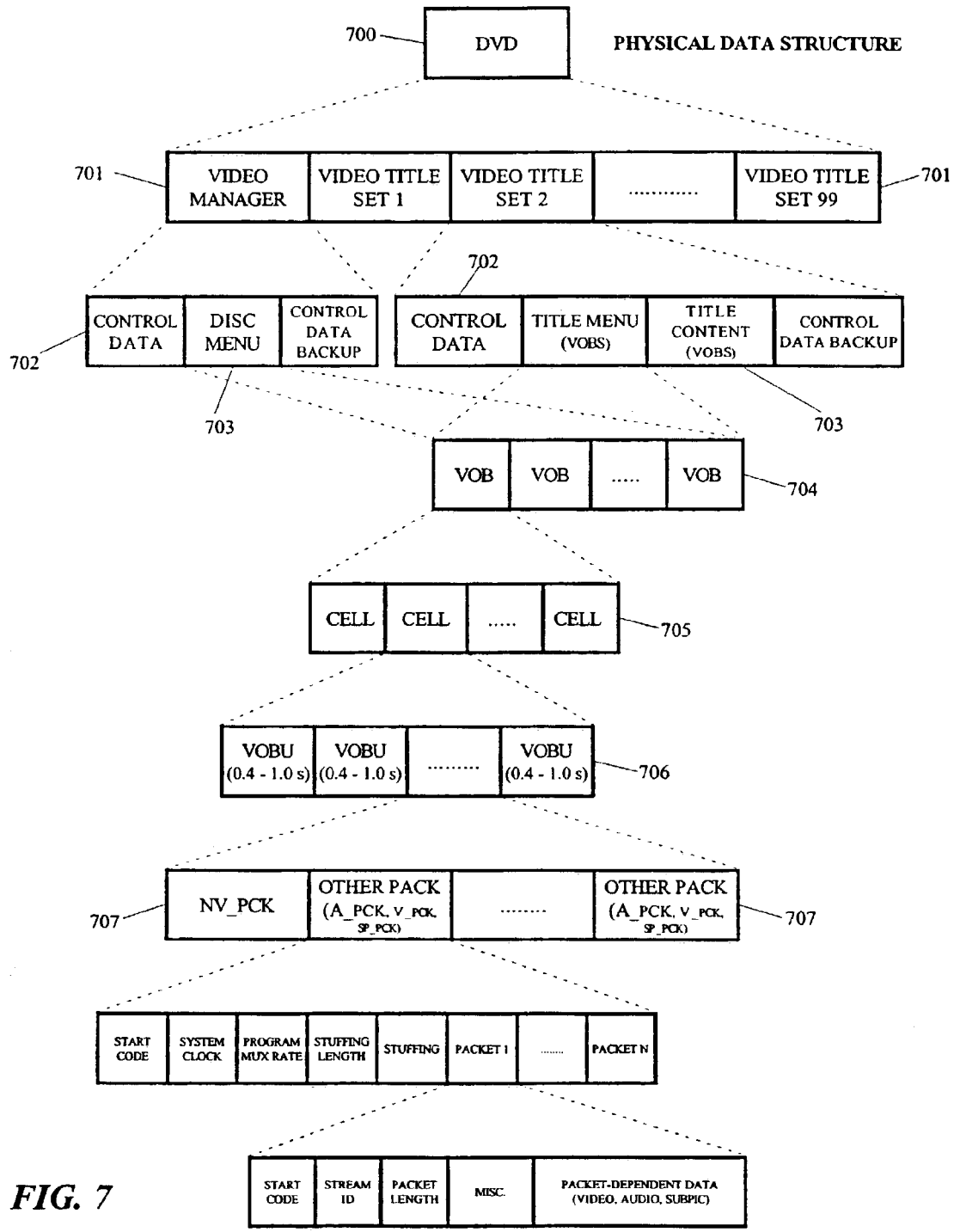
FIG. 7 is a block diagram illustrating a convention DVD physical data structure.
Figure 8:
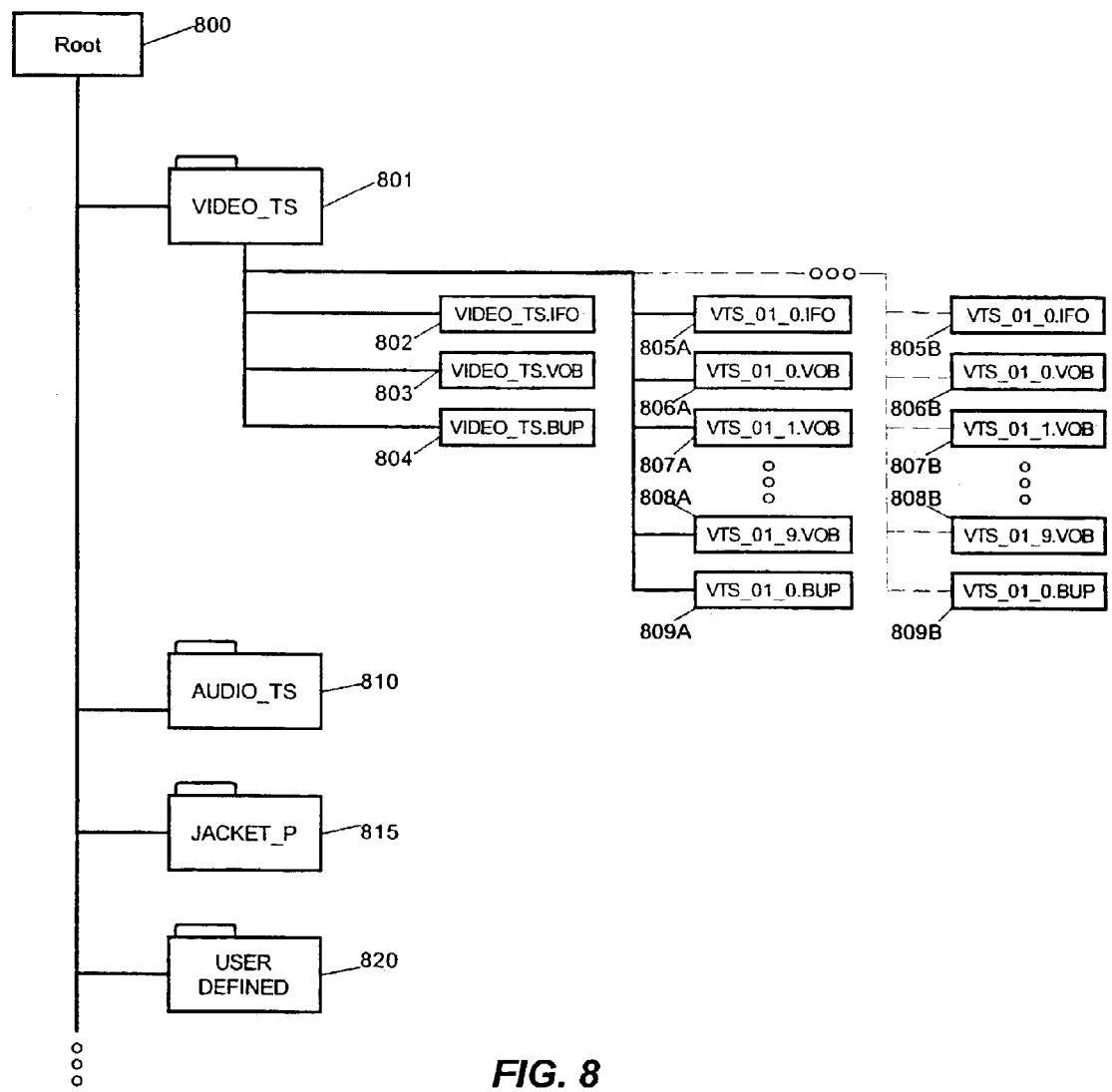
FIG. 8 is a directory tree illustrating a conventional DVD directory and file structure.

FIG. 6 is a flow chart illustrating a process for verifying suspected defective sectors subsequent to the detecting and tracking process of FIG. 5. Significantly, in order to minimally inconvenience the user, the verification process can be advantageously executed just before ejection of the disc. Specifically, in step 601, an existing defect list can be loaded. Notably, the defect list can be a sorted defect list. Additionally, in step 602 the defect candidate list can be loaded. Significantly, the invention is not limited to retrieving a previously sorted defect list and defect candidate list. Rather, in an alternative aspect of the present invention, the lists can be retrieved and dynamically sorted in a structured order, for example ascending or descending order.

In any event, in step 603, the lists can be compared and those sectors in the defect candidate list which are already in the defect list are discarded from the defect candidate list. Notably, where the lists have been sorted in a structured order, the defect candidate list need only be subtracted from the defect list to determine which sectors in the defect candidate list have not yet been added to the defect list. The remaining sectors are determined to be a set of suspected defective sectors which are to be subsequently verified.

In step 604, the remaining sectors are individually verified to determine whether, in fact, the sectors are defective. If it is determined that a suspected defective sector is in fact defective, in step 605 the defective sector can be added to the defect list and removed from the defect candidate list. Otherwise, the defective sector is simply removed from the defect candidate list. Finally, in steps 606 and 607, the defect list can be sorted according to the structured order and written to the defect list in the re-writable DVD.

What is claimed is:

1. A method for updating a sector defect list in a DVD comprising:
   executing a viewer operable play function to playback program content recorded on the DVD;
   detecting at least one error associated with at least one corresponding sector during said playback;
   adding at least one reference to each sector associated with said error to a defect candidate list;
   comparing said defect candidate list and said sector defect list to identify matching sector references;
   removing matching sector references from said defect candidate list to provide an updated defect candidate list; and
   updating said sector defect list based upon said updated defect candidate list.

2. The method of claim 1, further comprising
   determining whether each sector remaining in said defect candidate list is a defective sector prior to updating said sector defect list based upon on said updated defect candidate list.

3. The method of claim 1, further comprising:
   removing from said defect candidate list a reference to each sector for which a corresponding reference has been added to the sector defect list.

4. The method of claim 1, wherein said step of comparing said sector defect list and said defect candidate list comprises the steps of:
   sorting said defect candidate list in a structured order;
   sorting the sector defect list in said structured order; and,
   subtracting said sorted defect candidate list from said sorted sector defect list to provide said updated defect candidate list.

5. The method of claim 4, wherein said sorting steps comprise:
   sorting said defect candidate list in ascending order; and,
   sorting the sector defect list in ascending order.

6. The method of claim 4, wherein said sorting steps comprise:
   sorting said defect candidate list in descending order; and,
   sorting the sector defect list in descending order.

7. A method for updating a sector defect list in a DVD comprising:
   checking sectors on the DVD for errors by playback of said DVD in normal operation;
   adding references to a defect candidate list for checked sectors having errors during normal playback;
   identifying defective sector references in said defect candidate list having a corresponding sector reference in the sector defect list; and,
   removing the identified references from said defect candidate list.

8. The method of claim 7, wherein said step of adding references to a defect candidate list comprises:
   detecting an unrecoverable error during said playback operation:
   identifying a processed sector associated with said unrecoverable error; and,
   adding a reference to said identified sector to said defect candidate list.

9. The method of claim 7, wherein said identifying step comprises:
   comparing said defect candidate list to the sector defect list to identify each sector having a reference in both the sector defect list and said defect candidate list.

10. The method of claim 8, further comprising:
    adding sector references remaining in said defect candidate list to the sector defect list; and
    removing from said defect candidate list references to each sector for which a corresponding reference has been added to the sector defect list.

11. The method of claim 9, wherein said step of identifying each sector having a reference in both the sector defect list and said defect candidate list comprises:

sorting said defect candidate list in a structured order;
sorting the sector defect list in said structured order; and,
subtracting said sorted defect candidate list from said sorted sector defect list, said subtraction resulting in said identified sectors.

12. The method of claim 11, wherein said sorting steps comprise;
sorting said defect candidate list in ascending order; and,
sorting the sector defect list in ascending order.

13. The method of claim 11, wherein said sorting steps comprise:
sorting said defect candidate list in descending order; and,
sorting the sector defect list in descending order.

14. A machine readable storage having stored thereon, a computer program having a plurality of code sections for updating a sector defect list in a DVD, said code sections executable by a machine for causing the machine to perform the steps of:
executing a viewer operable play function to playback program content recorded on the DVD;
detecting at least one error associated with at least one corresponding sector during said playback;
adding at least one reference to each sector associated with said error to a defect candidate list;
comparing said defect candidate list and said sector defect list to identify matching sector references;
removing matching sector references from said defect candidate list to provide an updated defect candidate list; and
updating said sector defect list based upon on said updated defect candidate list.

15. The machine readable storage of claim 14, further comprising:
determining whether each sector remaining in said defect candidate list is a defective sector prior to updating said sector defect list based upon on said undated defect candidate list.

16. The machine readable storage of claim 14, further comprising:
removing from said defect candidate list a reference to each sector for which a corresponding reference has been added to the sector defect list.

17. The machine readable storage of claim 14, wherein said step of comparing said sector defect list and said defect candidate list comprises the steps of:
sorting said defect candidate list in a structured order;
sorting the sector defect list in said structured order; and,
subtracting said sorted defect candidate list from said sorted sector defect list to provide said updated defect candidate list.

18. The machine readable storage of claim 17, wherein said sorting steps comprise:
sorting said defect candidate list in ascending order; and,
sorting the sector defect list in ascending order.

19. The machine readable storage of claim 17, wherein said sorting steps comprise:
sorting said defect candidate list in descending order; and,
sorting the sector defect list in descending order.

20. A machine readable storage having stored thereon, a computer program having a plurality of code sections for updating a sector defect list in a DVD, said code sections executable by a machine for causing the machine to perform the steps of:
checking sectors on the DVD for errors by playback of said DVD in normal operation;
adding references to a defect candidate list for checked sectors having errors during normal playback;
identifying defective sector references in said defect candidate list having a corresponding sector reference in the sector defect list; and,
removing the identified references from said defect candidate list.

21. The machine readable storage of claim 20, wherein said step of adding references to a defect candidate list comprises:
detecting an unrecoverable error during said playback operation;
identifying a processed sector associated with said unrecoverable error; and,
adding a reference to said identified sector to said defect candidate list.

22. The machine readable storage of claim 20, wherein said identifying step comprises:
comparing said defect candidate list to the sector defect list to identify each sector having a reference in both the sector defect list and said defect candidate list.

23. The machine readable storage of claim 20, further comprising;
adding sector references remaining in said defect candidate list to the sector defect list; and
removing from said defect candidate list references to each sector for which a corresponding reference has been added to the sector defect list.

24. The machine readable storage of claim 21, wherein said step of identifying each sector having a reference in both the sector defect list and said defect candidate list comprises:
sorting said defect candidate list in a structured order;
sorting the sector defect list in said structured order; and,
subtracting said sorted defect candidate list from said sorted sector defect list, said subtraction resulting in said identified sectors.

25. The machine readable storage of claim 24, wherein said sorting steps comprise,
sorting said defect candidate list in ascending order; and,
sorting the sector defect list in ascending order.

26. The machine readable storage of claim 24, wherein said sorting steps comprise:
sorting said defect candidate list in descending order; and,
sorting the sector defect list in descending order.

* * * * *